US011487859B2

(12) United States Patent
Chen et al.

(10) Patent No.: US 11,487,859 B2
(45) Date of Patent: Nov. 1, 2022

(54) BEHIND DISPLAY POLARIZED OPTICAL TRANSCEIVER

(71) Applicant: Apple Inc., Cupertino, CA (US)

(72) Inventors: Tong Chen, Fremont, CA (US); Mark T. Winkler, San Jose, CA (US); Ruonan Yang, Cupertino, CA (US); Tsu-Hui Lin, San Jose, CA (US); Wenrui Cai, San Jose, CA (US); Xiao Xiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 16/945,174

(22) Filed: Jul. 31, 2020

(65) Prior Publication Data
US 2022/0035200 A1 Feb. 3, 2022

(51) Int. Cl.
*G06F 21/32* (2013.01)
*G02F 1/1335* (2006.01)
(Continued)

(52) U.S. Cl.
CPC .......... *G06F 21/32* (2013.01); *G02F 1/13363* (2013.01); *G02F 1/133528* (2013.01);
(Continued)

(58) Field of Classification Search
None
See application file for complete search history.

(56) References Cited

U.S. PATENT DOCUMENTS

| 5,231,689 A | 7/1993 | Reidinger |
| 6,349,159 B1 | 2/2002 | Uebbing et al. |

(Continued)

FOREIGN PATENT DOCUMENTS

| CN | 105531653 | 4/2016 |
| CN | 107180853 | 9/2017 |

(Continued)

OTHER PUBLICATIONS

Gelinck et al., "X-Ray Detector-on-Plastic With High Sensitivity Using Low Cost, Solution-Processed Organic Photodiodes," IEEE, 2015, pp. 1-8.

(Continued)

*Primary Examiner* — Phu Vu
(74) *Attorney, Agent, or Firm* — Brownstein Hyatt Farber Schreck, LLP

(57) ABSTRACT

Configurations for display stacks of an electronic device and methods for mitigating crosstalk are disclosed. The display stack may include a transceiver module, which may be located under or behind the display. The transceiver module may include a transmitter module, which may provide polarized light from the transmitter that may suppress module crosstalk. The transceiver module also may include a receiver module, which may include polarization control elements and an analyzer for differentiating between a target signal and a crosstalk signal. The polarization control on both the transmitter module and receiver module sides may suppress the crosstalk signals, which may be due to the reflections between and within the elements of the display stack and resulting from positioning the transceiver module behind the display.

23 Claims, 12 Drawing Sheets

(51) Int. Cl.
  *G06F 3/041*    (2006.01)
  *G02F 1/13363*  (2006.01)
  *G06F 1/16*     (2006.01)

(52) U.S. Cl.
  CPC ........ *G06F 1/1626* (2013.01); *G06F 3/04184* (2019.05); *G02F 1/133545* (2021.01); *G02F 1/133638* (2021.01)

(56) References Cited

U.S. PATENT DOCUMENTS

| | | | |
|---|---|---|---|
| 6,529,661 | B2 | 3/2003 | Kropp |
| 6,556,349 | B2 | 4/2003 | Cox et al. |
| 6,586,776 | B1 | 7/2003 | Liu |
| 6,910,812 | B2 | 6/2005 | Pommer |
| 6,919,681 | B2 | 7/2005 | Cok et al. |
| 6,946,647 | B1 | 9/2005 | O'Neill et al. |
| 6,948,820 | B2 | 9/2005 | Veligdan et al. |
| 7,021,833 | B2 | 4/2006 | Loh |
| 7,444,083 | B2 | 10/2008 | Ohashi et al. |
| 7,495,272 | B2 | 2/2009 | Maruyama et al. |
| 7,499,094 | B2 | 3/2009 | Kuriyama |
| 7,518,462 | B2 | 4/2009 | Kanno et al. |
| 7,706,073 | B2 | 4/2010 | Munro |
| RE41,673 | E | 9/2010 | Ma |
| 7,842,246 | B2 | 11/2010 | Wohlstadter et al. |
| 8,077,393 | B2 | 12/2011 | Steenblik |
| 8,305,400 | B2 | 11/2012 | Otani |
| 8,310,413 | B2 | 11/2012 | Fish et al. |
| 8,603,642 | B2 | 12/2013 | Hatwar et al. |
| 8,624,853 | B2 | 1/2014 | Han et al. |
| 8,625,058 | B2 | 1/2014 | Kozuma et al. |
| 8,664,655 | B2 | 3/2014 | Lee et al. |
| 8,743,027 | B2 | 6/2014 | Wu et al. |
| 8,780,065 | B2 | 7/2014 | Ribeiro et al. |
| 9,007,349 | B2 | 4/2015 | Tseng |
| 9,064,451 | B2 | 6/2015 | Lynch et al. |
| 9,112,043 | B2 | 8/2015 | Arai |
| 9,183,779 | B2 | 11/2015 | Soto |
| 9,342,181 | B2 | 5/2016 | Wyatt et al. |
| 9,530,381 | B1 | 12/2016 | Bozarth et al. |
| 9,570,002 | B2 | 2/2017 | Sakariya et al. |
| 9,614,168 | B2 | 4/2017 | Zhang et al. |
| 9,633,247 | B2 | 4/2017 | Pope et al. |
| 9,741,286 | B2 | 8/2017 | Sakariya et al. |
| 9,762,329 | B2 | 9/2017 | Motohara |
| 9,870,075 | B2 | 1/2018 | Han et al. |
| 9,909,862 | B2 | 3/2018 | Ansari et al. |
| 9,947,901 | B2 | 4/2018 | Shedletsky et al. |
| 10,073,228 | B2 | 9/2018 | Polleux et al. |
| 10,079,001 | B2 | 9/2018 | Hodges |
| 10,090,574 | B2 | 10/2018 | Wu |
| 10,115,000 | B2 | 10/2018 | Mackey et al. |
| 10,222,475 | B2 | 3/2019 | Pacala |
| 10,290,266 | B2 | 5/2019 | Kurokawa |
| 10,331,939 | B2 | 6/2019 | He et al. |
| 10,410,037 | B2 | 9/2019 | He et al. |
| 10,453,381 | B2 | 10/2019 | Kurokawa |
| 10,474,286 | B2 | 11/2019 | Bae et al. |
| 10,551,662 | B2 | 2/2020 | Kimura et al. |
| 10,565,734 | B2 | 2/2020 | Bevensee et al. |
| 10,614,279 | B2 | 4/2020 | Kim et al. |
| 10,637,008 | B2 | 4/2020 | Harada et al. |
| 10,664,680 | B2 | 5/2020 | Xu et al. |
| 10,713,458 | B2 | 7/2020 | Bhat et al. |
| 10,748,476 | B2 | 8/2020 | Zhao et al. |
| 10,809,853 | B2 | 10/2020 | Klenkler et al. |
| 10,838,556 | B2 | 11/2020 | Yeke Yazdandoost et al. |
| 10,872,222 | B2 | 12/2020 | Gao et al. |
| 10,903,901 | B2 | 1/2021 | Mitchell |
| 2003/0148391 | A1 | 8/2003 | Salafsky |
| 2004/0209116 | A1 | 10/2004 | Ren et al. |
| 2005/0094931 | A1 | 5/2005 | Yokoyama et al. |
| 2011/0176086 | A1 | 7/2011 | Katoh et al. |
| 2012/0113357 | A1 | 5/2012 | Cheng et al. |
| 2013/0113733 | A1* | 5/2013 | Lim .......... G02F 1/133308 345/173 |
| 2015/0309385 | A1 | 10/2015 | Shu et al. |
| 2017/0270342 | A1 | 9/2017 | He et al. |
| 2018/0032778 | A1 | 2/2018 | Lang |
| 2018/0323243 | A1 | 11/2018 | Wang |
| 2019/0034686 | A1 | 1/2019 | Ling et al. |
| 2019/0130155 | A1 | 5/2019 | Park |
| 2019/0221624 | A1 | 7/2019 | Lin et al. |
| 2019/0293849 | A1* | 9/2019 | Du .......... G02B 5/005 |
| 2020/0051499 | A1 | 2/2020 | Chung et al. |
| 2020/0209729 | A1 | 7/2020 | Chen et al. |
| 2020/0241138 | A1* | 7/2020 | Allen .......... G01S 7/481 |
| 2020/0265206 | A1 | 8/2020 | Chung et al. |
| 2020/0293741 | A1 | 9/2020 | Du |
| 2020/0342194 | A1 | 10/2020 | Bhat et al. |
| 2021/0014429 | A1 | 1/2021 | Alasirnio et al. |
| 2021/0050385 | A1 | 2/2021 | Chuang et al. |
| 2021/0064159 | A1 | 3/2021 | Yeke Yazdandoost et al. |
| 2021/0089741 | A1 | 3/2021 | Yeh et al. |
| 2021/0091342 | A1 | 3/2021 | Chen et al. |
| 2021/0255668 | A1 | 8/2021 | Xiang et al. |
| 2021/0287602 | A1 | 9/2021 | Chen et al. |
| 2021/0396935 | A1 | 12/2021 | Chen et al. |
| 2022/0158141 | A1 | 5/2022 | Yuki et al. |

FOREIGN PATENT DOCUMENTS

| | | |
|---|---|---|
| CN | 107271404 | 10/2017 |
| CN | 107330426 | 11/2017 |
| CN | 107515435 | 12/2017 |
| CN | 108292361 | 7/2018 |
| CN | 108885693 | 11/2018 |
| CN | 109074475 | 12/2018 |
| CN | 109791325 | 5/2019 |
| CN | 109983471 | 7/2019 |
| DE | 202004002512 | 3/2005 |
| EP | 2463927 | 8/2013 |
| EP | 3171254 | 5/2017 |
| EP | 3404484 | 11/2018 |
| EP | 3438880 | 2/2019 |
| JP | H0642898 | 2/1994 |
| JP | 6127447 | 5/2017 |
| KR | 20050022260 | 3/2005 |
| WO | WO 17/204777 | 11/2017 |
| WO | WO 18/093798 | 5/2018 |
| WO | WO 18/186580 | 10/2018 |
| WO | WO 18/210317 | 11/2018 |

OTHER PUBLICATIONS

Garcia de Arquer et al., "Solution-processed semiconductors for next-generation photodetectors," Nature Reviews—Materials, 2017, vol. 2, No. 16100, pp. 1-16.

* cited by examiner

BEHIND DISPLAY POLARIZED OPTICAL TRANSCEIVER

FIELD

This disclosure relates generally to electronic devices with a sensor behind a display. More particularly, this disclosure relates to a mobile device including a polarized optical transceiver used for sensing and reducing crosstalk in a display stack of the mobile device.

BACKGROUND

Generally, mobile devices may be used in various ways such as placing telephone calls and fingerprint recognition for user authentication. When placing a telephone call, a proximity sensor may be used for detecting when the user is on the call and may detect when the mobile device is touching or near the ear of the user. Due to lack of calibration and/or changing back reflections of signals within the mobile device, the proximity target detection may fail and result in degradation in a user's phone call experience. The back reflections within the mobile device may be module crosstalk where a sensor may receive light that was reflected within the mobile device without exiting the mobile device, thus producing an erroneous signal.

SUMMARY

Embodiments of the systems, devices, methods, and apparatuses described in the present disclosure are directed to a mobile device with a polarized optical transceiver behind a display. Also described are systems, devices, methods, and apparatuses directed to reducing module crosstalk and differentiating between crosstalk signals and target signals. The mobile device may include a transmitter module which an orientation of the optical axis may provide light to a display stack, including the display. Some of the light may pass through the display stack and reflect off of a sample, return back through the display stack, and be received by a receiver module. Some of the light may be reflected and/or scattered between the elements of the display stack and may be received by the receiver module as crosstalk signals that did not reflect off of the sample. The receiver module may include polarization control elements that may allow differentiation between the erroneous crosstalk signals and the polarized light reflected off a target external to the cover glass. The polarized optical transceiver reduces the crosstalk signals, which may lead to better functionality of the mobile device and may allow the polarized optical transceiver to be located behind the display layer of the mobile device.

In some examples, the present disclosure describes an optoelectronic device for mitigating crosstalk. The optoelectronic device may include a housing, a cover glass attached to the housing, a display disposed within the housing and viewable through the cover glass, a transmitter module positioned under the display, and a receiver module positioned under the display. In some examples, the transmitter module may include a transmitter polarization control element, and an optical emitter configured to emit light toward the transmitter polarization control element, where the transmitter polarization control element may change the polarization states of the light and the polarized light may propagate toward the display. In some examples, the receiver module may include a receiver polarization control element and an optical receiver configured to detect a portion of the polarized light reflected off a target external to the cover glass and received through the receiver polarization control element. In some examples, the optoelectronic device further may include a display stack, where the display stack may include the display and a thin film transistor stack positioned under the display. In some examples, the polarized light may have a polarization that aligns with an orientation of the optical axis of the thin film transistor stack, the polarized light may suppress crosstalk signals by aligning the polarized light with an orientation of the optical axis of the display stack, and the receiver polarization control element may differentiate between the crosstalk signals and the target signal. In some examples, the optoelectronic device may include a display stack, where the transmitter polarization control element may polarize light and may align the polarization of light to an orientation of the optical axis of the display stack. In some examples, the optical receiver may include a polarization analyzing receiver. In some examples, the receiver module may include a compensating element such as an optical compensator. In some examples, the compensating element may be or include a wave plate with a fixed retardation and in some examples the compensating element may be or include a dielectric retarder.

In some examples, the polarized light may be p-polarized light and the p-polarized light has a polarization that aligns with an orientation of the optical axis of the thin film transistor stack. In some examples, the emitter may be an edge emitting laser configured to emit a linearly polarized light. In some examples, the receiver module may be configured to filter out crosstalk signals with the receiver polarization control element. In some examples, the transmitter polarization control element may be a first transmitter polarization control element and may be a polarizer. In some examples, the optoelectronic device may include a second transmitter polarization control element that may include a transmitter compensating element, and the receiver polarization control element may be a wave plate. In some examples, the transmitter module may include a beam shaping optical element and the receiver module may include a beam shaping optical element. In some examples, the optoelectronic device may include a transmitter polarization monitor configured to monitor properties of the polarized light.

In some examples, the present disclosure describes a method for mitigating crosstalk in an electronic device. The method may include emitting light using a transmitter module, which may include polarizing the emitted light, providing the polarized light through an element of a display stack including a display, to a target, receiving a reflection of the polarized light from the target, at a receiver module, analyzing the received reflection of the polarized light, and differentiating between the reflection of the polarized light from the target and a crosstalk generated by a second reflection of the polarized light off of or within the display stack. In some examples, the method may include suppressing the crosstalk signals by receiving the reflection of the polarized light from the target through a back film that passes a first part of the polarized light through the back film and reflects a second part of the polarized light in a direction of the receiver module and receiving the polarized light from the back film by a thin film transistor stack, where the polarization of the polarized light that matches the orientation of the optical axis of the thin film transistor stack. In some examples, the method may include suppressing the crosstalk signals by providing p-polarized light and reducing back reflections at an interface between a thin film transistor stack and a back film. In some examples, the method may include receiving the polarized light from the transmitter module and by a back film where the polarization of the polarized light matches the orientation of the optical axis of the back film. In some examples, the method may include actively monitoring the polarization of the polarized light. In some examples, the method may also include polarization locking the polarized light by using a transmitter polarization control element.

In some examples, the present disclosure describes a mobile device. The mobile device may include a display stack, a transmitter module and a receiver module. In some examples, the display stack may include a display, a thin film transistor stack disposed under the display, and a back film disposed under the thin film transistor stack. In some examples, the transmitter module may include multiple emitters and the receiver module may include a receiver optical element, a receiver compensating element, a polarization analyzer, and a detector. In some examples an emitter of the emitter module may include a vertical cavity surface emitting laser. In some examples, the mobile device may include a transmitter optical element that may be or include a microlens array collimator, a liquid crystal cell for switching between polarizations of light, and a transmitter polarization element that may include a surface grating of the vertical cavity surface emitting laser. In some examples, the multiple emitters may have alternating polarizations and the multiple emitters may be individually addressable to select a polarization of light. In some examples, the mobile device may include a liquid crystal cell for switching between polarizations of light and a temperature sensing element to compensate for a retardance temperature dependence of the liquid crystal cell. In some examples, the liquid crystal cell may include a liquid crystal half-wave plate.

In addition to the exemplary aspects and embodiments described above, further aspects and embodiments will become apparent by reference to the drawings and by study of the following description.

BRIEF DESCRIPTION OF THE DRAWINGS

The use of the same or similar reference numerals in different figures indicates similar, related, or identical items.

Figure 1A:
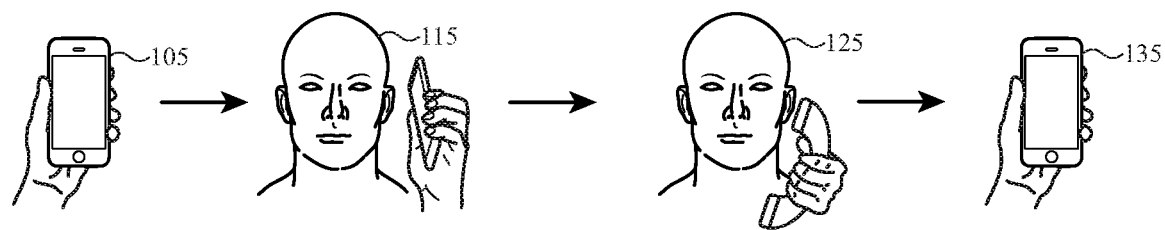
FIG. 1A illustrates an example use of a mobile device.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to any single embodiment. To the contrary, it is intended to cover alternatives, modifications, and equivalents as can be included within the spirit and scope of the described embodiments as defined by the appended claims. Likewise, although multiple embodiments are described with certain terminology, elements, and structures, it should be appreciated that any embodiment disclosed herein may incorporate elements and/or structures disclosed with respect to other embodiments.

Generally, electronic devices, such as mobile devices, may be used to place a telephone call by a user. The mobile device may employ a sensor, such as a proximity sensor, to determine the proximity of the mobile device to a target of interest, such as but not limited to, the user's ear. The proximity sensor may provide a signal that indicates that the mobile device is near to the ear of the user and may indicate the range of the target (e.g., the ear). In some examples, the mobile device may turn off various functions, such as the display illumination and the touch sensor, once the proximity sensor provides a signal that the mobile device is close or touching the user. Disabling certain functionalities of the mobile device during telephone calls may conserve power and avoid false touches to the screen of the mobile device. In some examples, the proximity sensor may not provide a range or distance between the mobile device screen and the user, and may provide a signal, such as a back reflection signal, depending on the range and/or reflectivity of the target.

In some examples, the proximity sensor may include a transceiver module, which may be located behind or under the display. The transceiver module may include a transmitter module and a receiver module. In some examples, positioning the transceiver module behind the display may cause issues because the display stack of the mobile device, including the display, may be may be poorly transmissive and strongly diffractive of light and may cause a large reduction in the round trip signal level. Additionally, due to the strongly reflective and diffractive nature of the display stack, there may be large back reflections that are detected by the receiver module as module crosstalk. These crosstalk signals may cause proximity detection failures via saturating receiver capacity, by overwhelming a weak signal with noise and falsely triggering the proximity threshold with drift and lack of calibration.

In some examples, the crosstalk may be suppressed and/or reduced with the use of polarization optics in the transceiver module. By reducing the crosstalk in the display stack of the mobile device, the drift in crosstalk that affects proximity sensing may also be mitigated and result in fewer erroneously dropped calls. Additionally, the polarization optics also may allow for differentiation between the crosstalk signal and the target signal (e.g., the signal reflected from the sample that may include biometric information of the user). In some examples, the transceiver module may polarize the light as well as compensate for birefringence in the display stack. The receiver module may use a compensator and an analyzer to differentiate between the target signal and the crosstalk signal. In some examples, the receiver module may determine additional information from the target signal itself.

Additionally, mobile devices may be used for other functionality in addition to placing telephone calls, such as sensing and processing light to measure a user's biometric information. Mobile electronic devices and wearable electronic devices for sensing biometric information are growing in popularity and these devices may be small enough to be portable, handheld, or comfortably worn by a user. Different biometric information may be provided to the user such as heart rate, blood oxygenation, fingerprints, retinal patterns, blood vessel patterns, finger lengths, and so forth. The architectures of these mobile biometric electronic devices may include various components, in different configurations, which may affect the size of the device into which it is incorporated.

Because of the increasing emphasis on smaller, more compact electronic devices, the size and thickness of the components inside of the electronic device may be limited. In some examples, a particular size of the electronic device is targeted and each component within the electronic device is given a maximum form factor or area that the component(s) may occupy within the electronic device. Accordingly, the physical configuration of the individual components, such as optical elements, optical transmitters, optical receivers, displays, optical stacks, couplers, polarizers, optical lenses, display stacks, integrated circuits, such as a photonics integrated circuit and/or photonics assembly, may become increasingly important to the form factor of the device.

Disclosed herein are optical systems, devices, and methods for suppressing module crosstalk and differentiating between module crosstalk and a target signal. An electronic device may include a display stack with a display and a polarized optical transceiver module behind the display. The polarized optical transceiver module may include a transmitter module and a receiver module, which may each contain polarization control elements. The polarization control elements may provide polarized light of a favorable polarization to reduce module crosstalk. In some examples, the polarization of light may be aligned to a lateral axis or an orientation of the optical axis of the display stack, or to elements within the display stack such as the thin film transistor (TFT) stack. The polarization of light may be p-polarized, where the polarization may be determined by a major diffractive transmission/reflection in the display stack. In some examples, the polarization of light may be aligned to the orientation of the optical axis of the interface between the TFT stack and a back film. The polarized optical transceiver may mitigate reflections from the display and/or display stack and from elements within the display and/or display stack.

These and other embodiments are discussed below with reference to FIGS. 1A-10B. However, those skilled in the art will readily appreciate that the detailed description given herein with respect to these figures is for explanatory purposes only and should not be construed as limiting.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used throughout this specification, a reference number without an alpha character following the reference number can refer to one or more of the corresponding references, the group of all references, or some of the references. For example, "927" can refer to any one of the surface gratings 927 (e.g., surface grating 927A, surface grating 927B, and so forth), can refer to all of the surface gratings 927, or can refer to some of the surface gratings (e.g., both surface grating 927A and surface grating 927B) depending on the context in which it is used.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIG. 1A illustrates an example use 100 of a mobile device. As illustrated in FIG. 1A, the mobile device may be used to make a telephone call by a user. In FIG. 1A, in state 105 the user may be placing the telephone call or dialing on the mobile device, in state 115 the user may be placing the mobile device near or against the user's ear at the beginning of the telephone call, between state 115 and state 125 a time duration has passed while the user is participating in the telephone call, and state 135 the mobile device may have inadvertently terminated the call.

In state 105, after the user places the call and before the user places the mobile device near or up against the user's ear, the mobile device may disable some functionality of the mobile device and perform some baseline measurements. The functions on the mobile device may be disabled to reduce the likelihood of inadvertently hanging up in the middle of a telephone call and to conserve power. In some examples, the mobile device may turn off the screen and disable the screen touch sensors to save power and to avoid false touches during the telephone call. Disabling the function(s) may be triggered when the user makes the phone call and before the user places the mobile device near or against the user's ear, or disabling the function(s) may be triggered when the user places the mobile device near or against the user's ear as shown in state 115.

In some examples, the mobile device may include optical transmitters and optical receivers and may experience module crosstalk. Module crosstalk may occur when light emitted from the optical transmitters undergoes reflections and/or scattering between the various stack layers inside the module and the light from the optical transmitters may be unintentionally directed back to the optical receivers without reflecting off of the target or sample to be measured. As used herein, the terms "target" and "sample" may be used interchangeably.

In some examples, the module crosstalk in the mobile device may also be due to smudges or fingerprints on the cover glass of the mobile device. The term "cover glass" as used herein may be a transparent cover made of plastic, sapphire, glass, or other materials. At least some of the light emitted by the optical transmitter may pass through various elements of the display stack of the mobile device to the cover glass. Although the light may pass partially through the cover glass, the cover glass may have smudges and/or fingerprints on it, so the light may encounter the smudges and reflect back into the mobile device as a crosstalk signal. The crosstalk signal may be sensed along with a target signal and in some examples may be large enough to interfere with the target signal. Additionally, the optical receiver may not be capable of differentiating between the crosstalk signal and the target signal from the measured sample, which may produce erroneous measurements to the user.

In some examples, the mobile device may have a baseline measurement for the module crosstalk. The baseline measurement may be a measurement that is stored in the mobile device and/or the baseline measurement may be measured before the user places the mobile device near or against the user's ear. Although the module crosstalk may be baselined at or before state 115, between state 115 and state 125, the module crosstalk may drift. In some examples, the module crosstalk may drift toward a release threshold. If the crosstalk noise drifts across the release threshold, the signal may be interpreted as a failed frame, at which point the mobile device may release the telephone call and hang up as shown in state 135 of FIG. 1A. In some examples, reducing the absolute amount of crosstalk in the mobile device may proportionally reduce the crosstalk drift and may result in fewer dropped telephone calls.

Figure 1B:
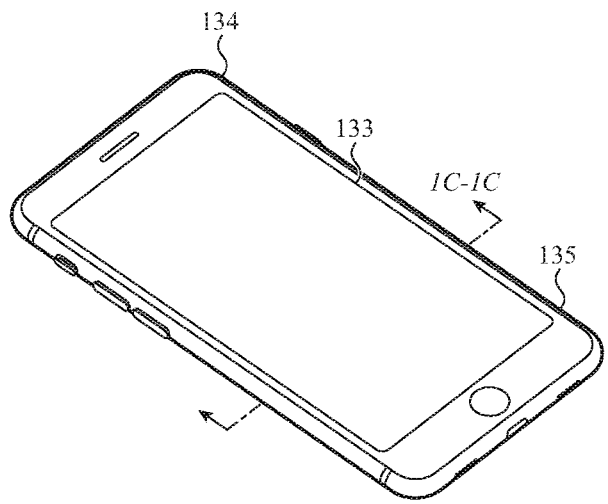
FIGS. 1B and 1C illustrate examples of a mobile device.
Figure 1C:
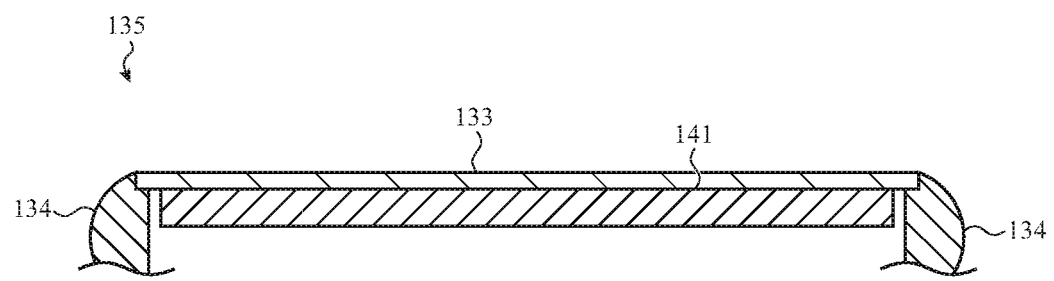

FIGS. 1B and 1C illustrate examples of a mobile device. FIG. 1B illustrates a mobile device 135 that includes a housing 134 and a cover glass 133. FIG. 1C illustrates a cross section view 1C-1C of the mobile device of FIG. 1B. The mobile device 135 of FIG. 1C includes a housing 134, a cover glass 133, and a display stack 141. As depicted in FIG. 1C, the display stack 141 may be suspended from the cover glass 133. Additionally, the cover glass 133 may be supported by the housing 134. In some examples, the display stack 141 may not abut the housing 134 in that the display stack 141 may be suspended from the cover glass 133.

Figure 2:
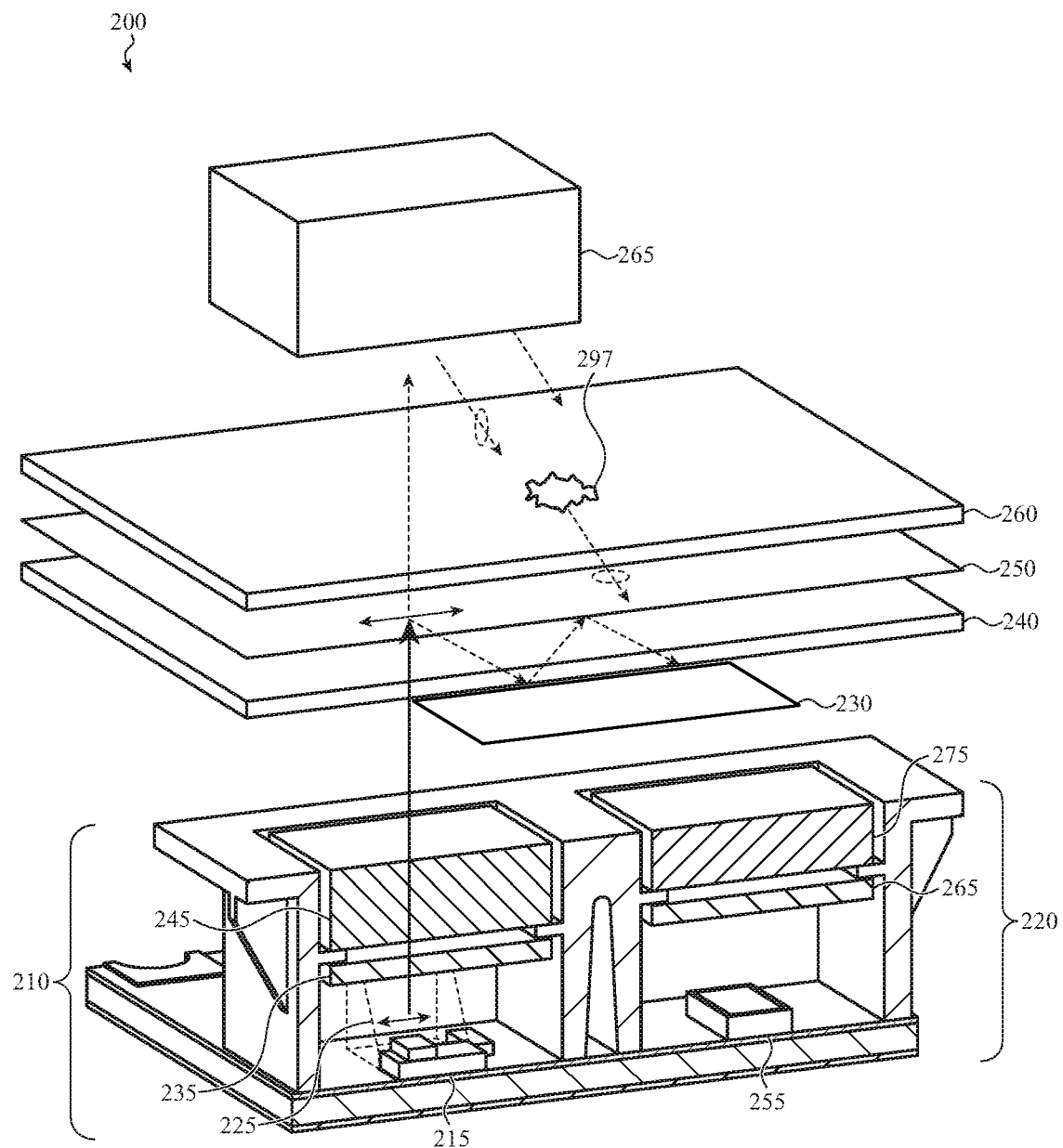
FIG. 2 illustrates an example of an electronic device display stack.

FIG. 2 illustrates an example of an electronic device display stack 200. The display stack 200 of the electronic device may include an engineered display back plate 230, a display back film stack 240, a display high reflector stack 250, a display cover glass stack 260, a transmitter module 210, and a receiver module 220. Although the display stack 200 includes individual elements such as a single engineered display back plate 230, a display back film stack 240, a display high reflector stack 250, a display cover glass stack 260, a transmitter module 210, and a receiver module 220, and so forth, multiples of these elements may be employed in the display stack 200. Additionally, each of the individual elements in the display stack 200 such as the single engineered display back plate 230, the display back film stack 240, the display high reflector stack 250, the display cover glass stack 260, and so forth are depicted as single layers, but each of these elements may include multiple layers. As used herein, the display stack 200 of the electronic device may include all of the elements or one or more of these elements. Generally, the display stack may include one or more elements such as the cover glass, one or more layers of light emitters, barriers, transistors, contacts and interconnects, Additionally, the term "stack" may be used to describe one or more optical elements, and in the example of a single optical element being referred to as a stack, the optical element may have one or more layers that make up the stack. As shown in FIG. 2, the transmitter module 210 and the receiver module 220 are positioned behind or under the display of the electronic device. In some examples, the display may be an organic light emitting diode (OLED) display, a light emitting diode (LED) display, or any other display.

In some examples, the transmitter module 210 may direct light to an engineered display back plate 230, which may provide light to a display back film stack 240. The engineered display back plate 230 may also provide mechanical support, passivation, and optical attenuation to the display back film stack 240. As used herein, the term "provide" may be used to describe actively or passively passing light from one element to another element. The display back film stack 240 may allow light to at least partially pass and/or diffract to a display high reflector stack 250, which may allow light to pass to a display cover glass stack 260. The light may at least partially pass or propagate through the display cover glass stack 260 to a sample or target 233 and part of the light may back reflect off of an aggressor 297 such as a smudge or fingerprint and be received at the receiver module 220 as crosstalk signals. The electronic device may be an optoelectronic device and may measure biometric information of the user by measuring light reflected from the sample or target 233. The biometric information may be measured at a location on the user, which may be represented by the target 233. The biometric information measured may include heart rate, blood oxygenation, fingerprints, retinal patterns, blood vessel patterns, any combination thereof, and so forth.

In FIG. 2, the transmitter module 210 may include an optical emitter 215, a first transmitter polarization control element 225, a second transmitter polarization control element 235, and beam shaping optics 245. In some examples, the optical emitter 215 and the optical receiver 255 may emit and receive coherent light or semi-coherent light or may emit and receive wavelengths of light in an infrared wavelength range of light, a near infrared wavelength range of light, or visible light, any combination thereof, and so forth. In some examples, the optical emitter 215 may be an edge emitting laser, which may emit linearly polarized light. In some examples, the optical emitter 215 may be a vertical cavity surface emitting laser as will be discussed in further detail with reference to FIGS. 10A-10B. The optical emitter 215 may emit light in the direction of the first transmitter polarization control element 225. In some examples, the first transmitter polarization control element 225 may receive the light from the optical emitter and may be a mirror, such as a 45 degree turning mirror. The light may be reflected by the first transmitter polarization control element 225 vertically or up toward the second transmitter polarization control element 235. In some examples, the first transmitter polarization control element 225 may be a waveguide or polarizer that may p-polarize the light. The second transmitter polarization control element 235 may be a polarizer, any type of wave plate, such as a retarder or rotator, or another form or type of optical element. The second transmitter polarization control element 235 may compensate for the display back film stack 240 at least by mitigating the retardation of the layers of the display back film stack 240. In some examples, the second transmitter polarization control element 235 may compensate for the retardation and/or birefringence of the display stack 200 and may ensure that p-polarized light is provided to the display back film stack 240. Generally, the first transmitter polarization control element 225 may polarization lock the polarization state of light and the second transmitter polarization control element 235 may compensate for retardance in the display back film stack 240. Additionally, the second polarization control element 235 may pre-compensate excessive retardation from any birefringence of the beam shaping optics 245. In some examples, the transmitter polarization control element 235 may change the polarization states of the light and pass the light toward the display.

The second transmitter polarization control element 235 may provide light to or allow light to pass to the beam shaping optics 245. In some examples, the beam shaping optics 245 may collimate the light and may include a molded collimator or any other optical element or combined optical elements that may provide collimated light. The light may be directed from the beam shaping optics 245 of the transmitter module 210 and up to the display back film stack 240. While some of the light may continue up through the display high reflector stack 250, through the display cover glass stack 260 and up to the target 233, some of the light may get reflected and/or scattered between the display stack elements. In some examples, the reflected and/or scattered light may be received by the receiver module 220 as module crosstalk. The suppression and differentiation of the crosstalk signal by using favorable polarization states of light will be discussed in further detail herein with reference to FIGS. 3-10B.

The receiver module 220 may include an optical receiver 255, a receiver polarization control element 265, and receiver beam shaping optics 275. In some examples, the optical receiver 255 may be a polarization analyzing receiver, which may be a pixel sensor with polarizers. The receiver polarization control element 265 may be a polarizer, any type of wave plate, such as a retarder or rotator, or any other optical element. In some examples, the wave plate may have a fixed or variable retardation, may be a thin film or dielectric retarder, a liquid crystal retarder, and so forth. In some examples, the receiver polarization control element 265 may be a distributed polarizer where individual pixels may each have a respective polarizer which may be orthogonal or 45 degrees or other degree of polarization. In some examples, the receiver beam shaping optics 275 may be a molded condenser or any other short focal length optical element.

The receiver module 220 may receive both the target signal (e.g., light reflected from the sample), and module crosstalk. If uncalibrated, this back reflection module crosstalk signal may interfere with proper target signal detection. In some examples, the receiver module 220 may analyze polarizations of light and may differentiate between crosstalk signals and target signals. In some examples, the receiver module 220 may both differentiate between crosstalk signals and target signals and suppress the crosstalk optical path between the transmitter module 210 and the receiver module 220.

In FIG. 2, two primary crosstalk paths are illustrated. Crosstalk path 280 may represent light that is emitted by the optical emitter 215 up toward the display back film stack 240. As shown in FIG. 2, the crosstalk path 280 may include light that may reflect and/or scatter between the display high reflector stack 250, the display back film stack 240 and the engineered display back plate 230 and back toward the receiver module 220. The crosstalk path 285 may represent light that is emitted by the optical emitter 215 and that propagates up through the display stack toward the display cover glass stack 260. An aggressor 297 (e.g., a smudge or fingerprint) may be on the external surface of the display cover glass stack 260 and the light may reflect and/or scatter off of this smudge or fingerprint back down to the receiver module 220. Both of these crosstalk paths 280, 285 may interfere with the target signal received by the receiver module 220. Although two specific crosstalk paths are illustrated in FIG. 2, light may be reflected or propagate between any of the elements in the display stack, which may result in crosstalk, including the transmitter module 210 and the receiver module 220. In some examples, the reflections and/or scattering between the transceiver module and the display may contribute to crosstalk, there may be reflections, waveguiding, and/or scattering within the display, there may be reflections and/or scattering from the cover glass, and there may be reflections and/or scattering within the transmitter and receiver modules or the transceiver module. As used herein, the term "transceiver module" may be used to describe the transmitter module and the receiver module.

Figure 3:
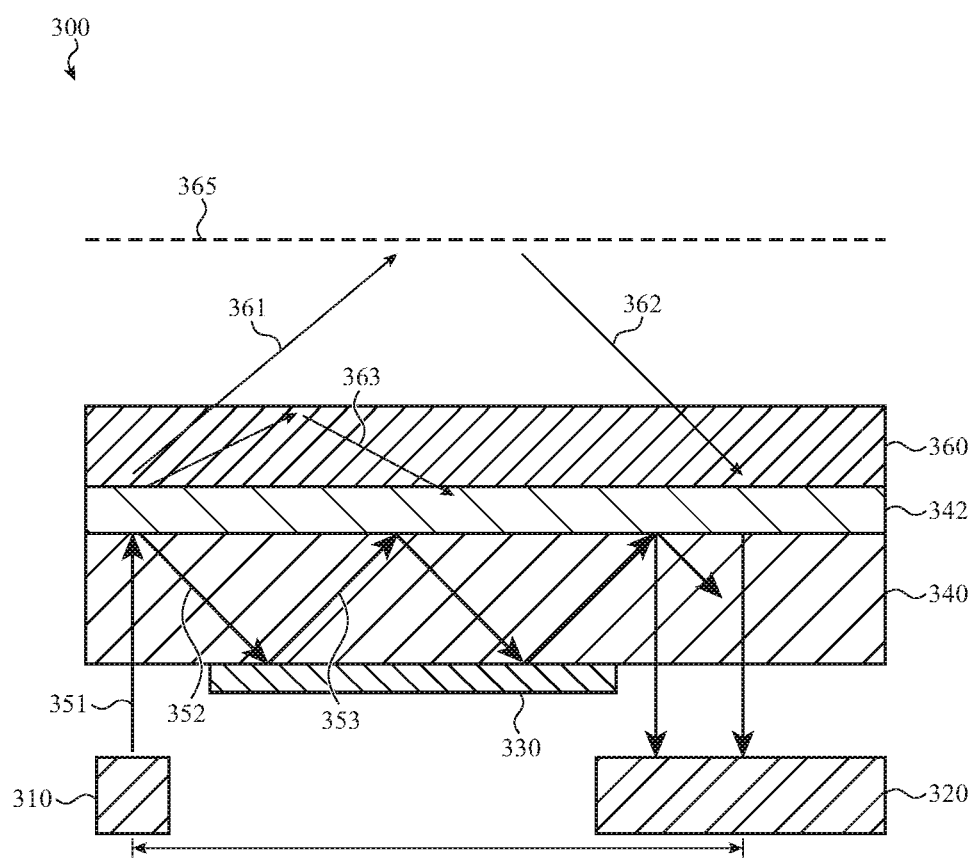
FIG. 3 illustrates an example of an electronic device display stack.

FIG. 3 illustrates an example of an electronic device display stack. The display stack 300 of the electronic display may include a transmitter module 310, a receiver module 320, an engineered display back plate 330, a display back film stack 340, a TFT stack 342, and the upper display 357. In some examples, the upper display 357 may include one or both of the display high reflector stack and the display cover glass stack (display high reflector stack and display cover glass stack not illustrated in FIG. 3). In some embodiments, the TFT stack 342 may be a TFT stack and an interconnect 342. Additionally, the upper display 357 may include a display or display layer, such as the OLED display. In some examples, the TFT stack 342 may also include an anode and/or a cathode contact of display pixels and corresponding interconnect routings. Additionally, FIG. 3 illustrates various crosstalk paths and the crosstalk dependence on the polarization of light emitted by the transmitter module 310 located behind or under the OLED display. Although the OLED display will be discussed, other types of displays, such as LCDs may also be used.

In FIG. 3, aggressors on the cover glass or upper display 357 and the interfaces of the display back film stack 340 with the TFT stack 342 above and the engineered display back plate 330 below may contribute to reflections, diffraction, and/or scattering that result in module crosstalk. Although a single transmitter is illustrated in FIG. 3, multiple transmitters may be used in the electronic device. Similarly, one or more receivers may be used or one or more transceivers may be employed.

In some examples, the OLED display may be part of the upper display 357. The OLED display, OLED pixels, the anode and cathode, the TFT stack 342, and other elements in the display stack of FIG. 3 may function as a single layer or multiple layers of high-reflective, diffractive, and lossy layers for light emitted by the transmitter module 310 (e.g., through display optical signals). In some examples, the TFT stack 342 may be a TFT stack and an interconnect 342. In the example of FIG. 3, the transmitter module 310 and the receiver module 320 are positioned under the OLED display, which may result in a reduced round-trip signal on the order of four to five orders of magnitudes. This reduction in round-trip signal may be due to transmission losses and collecting inefficiencies in the display stack and transceiver module when compared to positioning the optical transceiver behind the cover glass.

In some examples, light may be emitted by the transmitter module 310 and may propagate into the display back film stack 340 as shown by ray 351. Some of the light may propagate through the display back film stack 340 and some of the light may reflect from the interface between the display back film stack 340 and the TFT stack 342. The reflected light may be directed back toward the engineered display back plate 330 as shown by ray 352. At or near the interface of the engineered display back plate 330 and the display back film stack 340, the light may partially be absorbed and/or leaked and partially reflected back up toward the TFT stack 342 and through the display back film stack 340 as shown by ray 353. The light may continue reflecting similarly to the total internal reflection that takes place in a waveguide. After one or more reflections, between the interfaces of the display back film stack 340 with the TFT stack 342, the light may partially reflect from, attenuate, and/or scatter through the back film surface on the bottom and may be received by the receiver module 320. In some examples, the display back film stack 340 may include films such as polyethylene terephthalate (PET), polyimides (PI), or any other polymer films or materials. In some examples, the display back film stack 340 may serve as a substrate to the TFT stack 342.

In some examples, the light emitted by the transmitter module 310 may propagate up through the display back film stack 340, through the TFT stack 342, and up to the upper display 357. Some of the light may propagate through the upper display 357 and to the sample surface as shown by ray 361. The light that reaches the sample 333 may reflect off of the sample surface or may propagate through the sample surface and reflect off of the sample volume as shown by ray 362 and back toward the receiver module 320. The light that reflects from the sample surface and the sample volume may be target signals or sample signals and may be indicative of the desired measurement.

In some examples, after the light propagates through the surface of the display back film stack 340, the TFT stack 342, and into the upper display 357, some of the light may be reflected from the aggressors on the cover glass of the upper display 357 as shown by ray 363. In some examples, aggressors may be smudges, fingerprints, scratches, and so forth, on the cover glass. The light reflected from the surface of the cover glass may be directed back down to the receiver module 320 as crosstalk signals. Although both the sample signal and the crosstalk signal may both be received by the receiver module 320, the magnitude of the crosstalk signal may be significantly larger than the sample signal.

In some examples, the transmitter module 310 may emit polarized light which may have a p-polarization of light or may be approximately parallel to the plane of the elements of the display stack 300. Although either s-polarization or p-polarization of light may be used, in some examples, by using the p-polarization of light, lower reflectance may result at the TFT stack 342. In some examples, the polarization of the light may reduce crosstalk in the TFT stack 342 as the metal layer reflectance depends on the polarization of light. In some examples, the polarized light may have a polarization that may be aligned with an orientation of the optical axis of the TFT/metal interconnect stack and/or birefringent thin film stack. In some examples, crosstalk signals may be suppressed by providing p-polarized light and by reducing back reflections at an interface between a high-occupation ratio metallic contact/interconnect layer and a dielectric or polymer back film. In some examples, the polarized light may match the birefringent optical axis of the back film. Generally, the polarization of light may have a polarization that aligns with an axis of lateral crosstalk propagation toward the receiver module of the display stack. By using the favorable p-polarization of light, crosstalk contributed by reflectance at or near the TFT stack 342 may be reduced by using a light source that emits polarized light. Additionally, by suppressing reflections at the interface between the TFT stack 342 and the display back film stack 340 stack and allowing more leakage at the interface between the display back film stack 340 and the engineered display back plate 330, crosstalk may be further reduced. In some examples, by using polarized light, the electronic device may be able to sense additional information than if the electronic device used randomly polarized light. In some examples, by using polarized light and analyzing on the receiver module side a difference may be detected between back reflections from smudges on the cover glass and the target signal. Additionally, in some examples, using the information from the polarized light, skin cell information may be used to detect tumors.

In some examples, the thin film layers of the upper display 357 and the PET of the engineered display back plate 330 may be birefringent, so for different polarizations of light, the index of refraction may vary and cause the light ray path to change. In some examples, the p-polarized light ray may propagate along an optical axis with a lower lateral index of refraction, resulting in a higher critical angle for total internal reflection and higher leakage of moderate angle of incidence into the engineered display back plate 330 and/or the TFT stack 342 at the interface(s), as opposed to the s-polarized light ray propagating along an optical axis with a higher index of refraction. In some examples, the engineered display back plate 330 may be an absorbing pressure sensitive adhesive (PSA). Because the engineered display back plate 330 may be absorptive, crosstalk may be reduced at the engineered display back plate 330 and display back film stack 340 interface.

Figure 4:
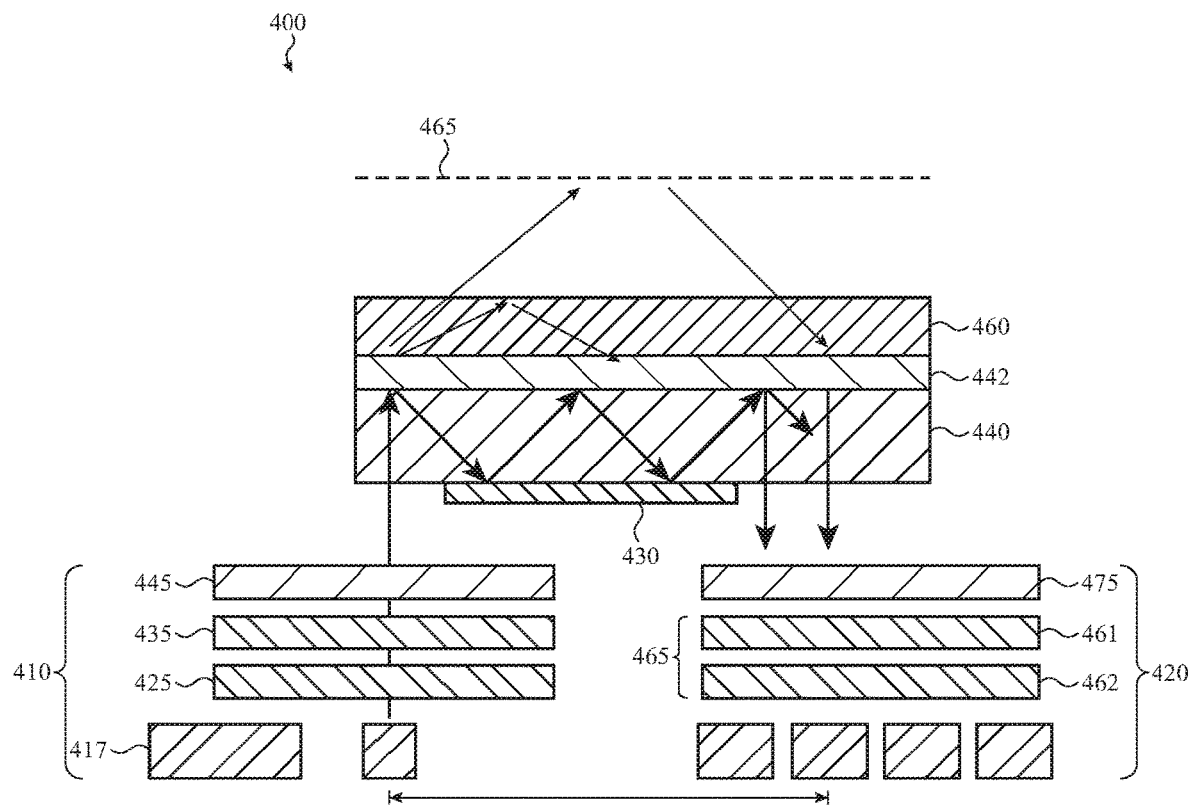
FIG. 4 illustrates an example of an electronic device display stack.

FIG. 4 illustrates an example of an electronic device display stack 400. FIG. 4 includes similar elements to FIG. 3 including the transmitter module 410, the receiver module 420, the back plate 430, the back film 440, the TFT stack 442, and the upper display 460. Additionally, FIG. 4 also includes the different crosstalk paths such as the wave guiding crosstalk of the back film 440 interfaces and the cover glass crosstalk reflections of the upper display 460. In FIG. 4, the transmitter module 410 of FIG. 4 includes the optical emitter 415, a transmitter polarization monitor 417, a first polarization control element 425, a second polarization control element 435, and beam shaping optics 445. In some embodiments, the transmitter polarization monitor 417 and the second polarization control element 435 are optional. In other embodiments, the transmitter module may include fewer or more polarization and/or optical elements.

In FIG. 4, part of the light from the optical emitter 415 may be split off and transmitted to the transmitter polarization monitor 417. The transmitter polarization monitor 417 may monitor various properties of light, such as the polarization state of light, the optical power, the wavelength of light, any combination thereof, and so forth. In some examples, the transmitter polarization monitor 417 may provide feedback and/or information to a controller (not illustrated in FIG. 4), which may provide adjustments to the optical emitter 415. For example, in the case that the optical power is low from the optical emitter 415, the controller may adjust the driving current of the optical emitter 415.

The first polarization control element 425 may lock or align the transmitter polarization of light. In some examples, after light passes through the first polarization control element 425, part of the light may be tapped or split and provided to the transmitter polarization monitor 417. The polarization of light may be measured to verify whether the polarization of light is the correct polarization. In some examples, the first polarization control element 425 may be a passive element.

The second polarization control element 435 may provide additional compensation to mitigate the retardation and/or birefringence that may be present in the display stack due to the transmitter optics 445, the back film 440, the back plate 430, the TFT stack 442, any combination thereof, and so forth. Additionally, the second polarization control element 435 may ensure that the light at the back film 440 and TFT stack 442 interface may be p-polarized light. In some examples, the second polarization control element 435 may be a passive element or may be an active element. In some examples, the transceiver module polarization baseline may be aligned with the back film 440 birefringence orientation. For example, the polarization may be aligned with the ordinary axis of the PET film that may be part of the back film 440, for increased crosstalk wave guiding suppression.

As illustrated in FIG. 4, the receiver polarization control element 465 may include a compensator 461 and an analyzer 462 in the receiver chamber. The receiver module 420 may also include a beam shaping optical element 475. The compensator 461 and the analyzer 462 may allow for further differentiation between the target signal and crosstalk signals due to aggressors. The receiver module 420 may include multiple sensors and in some embodiments each of the sensors may include a corresponding polarizer. In some examples, the compensator may be a wave plate and may alternatively be coated anywhere in the receiver module or display stack. Although the beam shaping optical element 475, the compensator 461, the analyzer 462, and other optical and polarization elements are referred to in the singular, one or more of the optical and/or polarization elements may be employed to achieve similar functionality.

Figure 5:
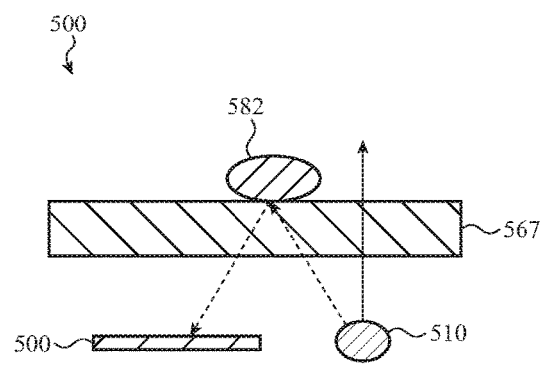
FIG. 5 illustrates an example of crosstalk in an electronic device.

FIG. 5 illustrates an example of crosstalk in an electronic device 500, which in some examples may be an optoelectronic device such as a mobile device. FIG. 5 includes the transmitter module 510, the receiver module 520, the cover glass 567, which may be part of the upper display and a smudge 582. FIG. 5 depicts one example of the transmitter module 510 emitting light up toward the cover glass 567. While some of the light may pass through the cover glass 567, part of the light may encounter a smudge 582 on the cover glass 567. The light may reflect and/or scatter from the smudge 582 back toward the receiver module 520 as undesirable crosstalk. In some embodiments, crosstalk may be due to other elements in the stack of the electronic device, but for discussion purposes, FIG. 5 illustrates crosstalk from aggressors such as smudges, fingerprints, scratches, and so forth, on the cover glass 567. FIG. 5 does not include any polarization elements and is one embodiment of an electronic device. Different embodiments of the electronic device of FIG. 5A, with added polarization elements will be discussed with reference to FIGS. 6A, 6B, 7A, 7B, 8A, and 8B.

Figure 6A:
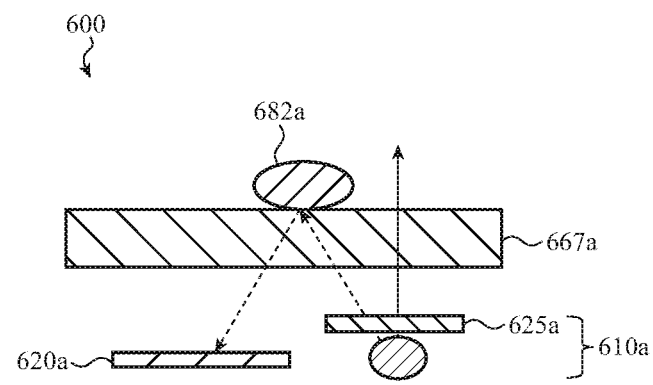
FIGS. 6A and 6B illustrate examples of crosstalk in an electronic device.
Figure 6B:
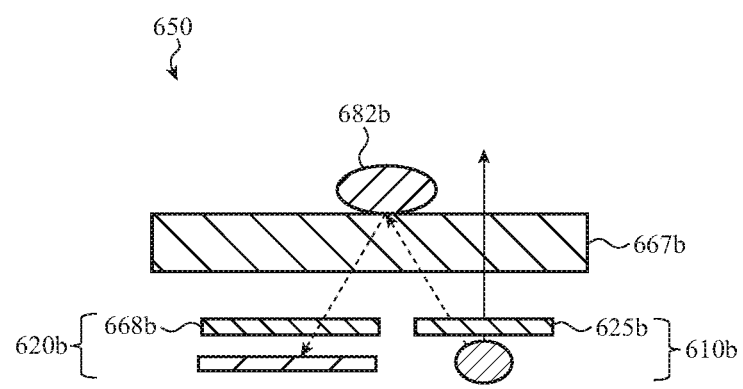

FIGS. 6A and 6B illustrate examples of crosstalk in an electronic device 600. The electronic devices of FIGS. 6A and 6B may include a transmitter module 610, a receiver module 620, a polarization control element 625, a cover glass 667, and an aggressor 682. The elements of FIG. 6A may be referred to as transmitter module 610a, receiver module 620a, a polarization control element 625a, a cover glass 667a, and an aggressor 682a, and similarly, the elements of FIG. 6B may be referred to as a transmitter module 610b, a receiver module 620b, a polarization control element 625b, a receiver polarization control element 661b, a cover glass 667b, and an aggressor 682b. Similarly numbered elements may have similar functionality as described herein. For example, the transmitter modules 610a and 610b may perform similar functions such as emitting polarized light. Additionally, in some examples, the aggressor may be referred to as either the smudge or the cover glass as reflections from either one are interpreted as module crosstalk.

In FIG. 6A, the transmitter module 610A of the electronic device 600 may include a polarization control element 625a. The polarization control element 625a may be a linear polarizer with the polarization axis oriented at zero degrees. Using linearly polarized light, different polarization signals may be detected at the receiver module. In the example of FIG. 6A, the receiver module may sense a cover glass signal, a smudge signal, and a target signal. In some examples, the receiver module may determine that the cover glass signal includes more polarization maintaining light than the target signal. Additionally, it may be determined that the smudge signal and the skin signal scramble the polarization, so it may be determined that the cover glass may be the aggressor. Thus, a different polarizer at the receiver module may be used to suppress the cover glass signal.

In FIG. 6B, a receiver polarization control element 661b of the electronic device 650 may be added to suppress aggressor signals and crosstalk on the receiver module side. In some examples, the receiver polarization control element 661b may be a linear polarizer with the polarization axis oriented at 90 degrees. This may provide a favorable target signal to cover glass crosstalk contrast enhancement of greater than approximately fifty percent.

Figure 7A:
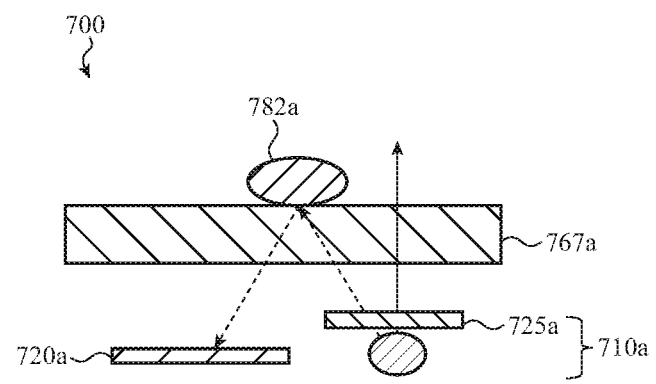
FIGS. 7A and 7B illustrate examples of crosstalk in an electronic device.
Figure 7B:
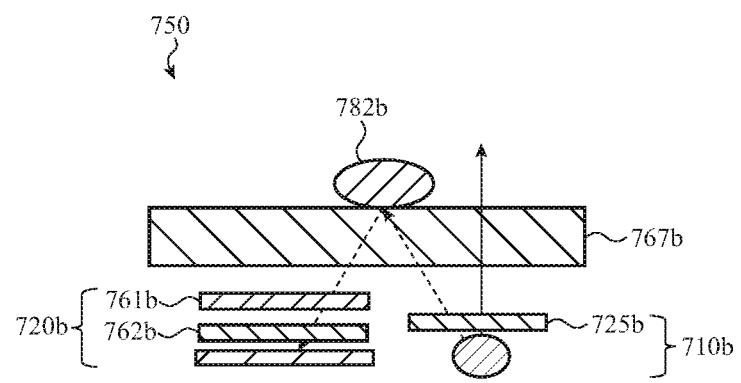

FIGS. 7A and 7B illustrate examples of crosstalk in an electronic device. FIGS. 7A and 7B have similar elements as FIGS. 6A and 6B. In FIG. 7A, the polarization control element 725a on the transmitter module side of the electronic device 700 may be a linear polarizer with a transmission axis oriented at 45 degrees. This polarization of light may cause the smudge signal to provide a larger right circular polarization component of light, while the cover glass may maintain most of the 45 degree polarization state and the target signal or skin signal may scramble the polarization. Similar to FIG. 6A, a polarizing element may be added on the receiver module side to suppress the smudge signal.

In FIG. 7B, a compensating element 761a and a receiver polarization control element 762b of the electronic device 750 may be added to suppress the crosstalk contribution from the smudge signal. In some examples, the receiver may be designed to screen for left circularly polarized light. In some examples, the left circularly polarized light may be provided with a compensating element 761b, which may be a quarter-wave plate oriented at approximately 45 degrees, and the receiver polarization control element 762b may be a linear polarizer with a polarization axis oriented at zero degrees. With the addition of the polarization control elements on the receiver module side, a favorable ratio of the target signal to the smudge signal may be provided for the electronic device.

Figure 8A:
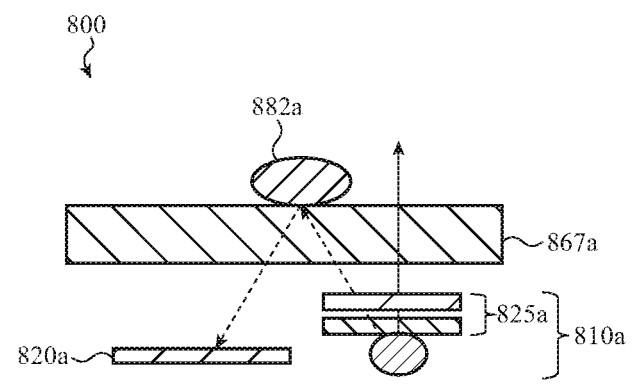
FIGS. 8A, 8B, and 8C illustrate examples of crosstalk in an electronic device.
Figure 8B:
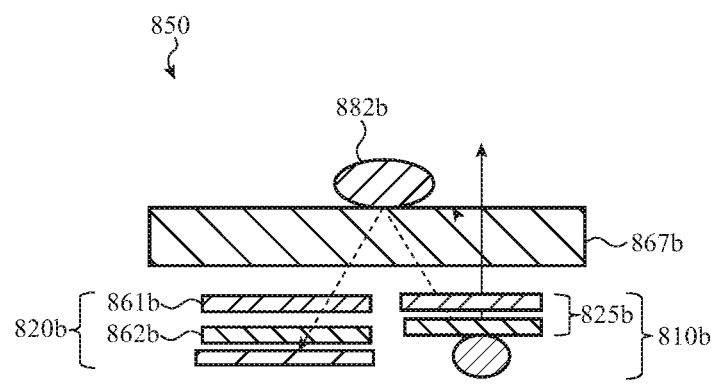
Figure 8C:
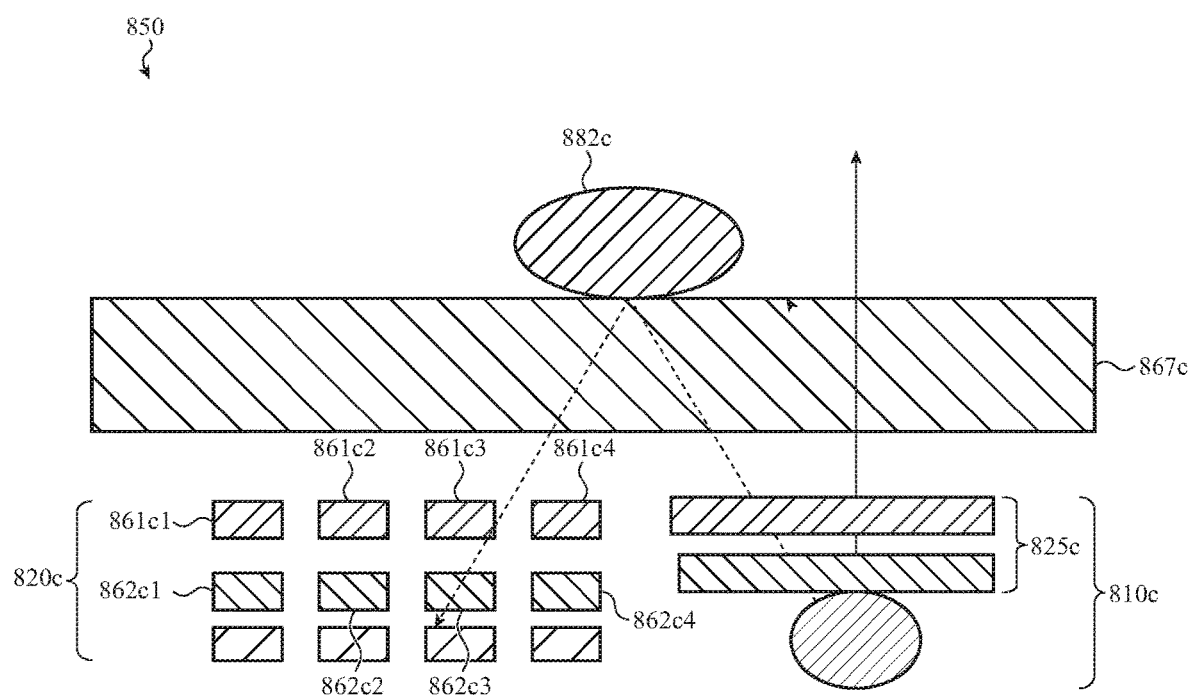

FIGS. 8A, 8B, and 8C illustrate examples of crosstalk in an electronic device. FIGS. 8A, 8B, and 8C have similar elements as FIGS. 6A-6B and 7A-7B. In FIG. 8A, the polarization control element 825a on the transmitter module side of the electronic device 800 may be a circular polarizer that provides left circularly polarized light. The cover glass signal may reverse the left circularly polarized light to switch to right circularly polarized light, while the smudge signal and the target signal may scramble the polarization signal. Thus, a polarizing element may be added on the receiver module side to suppress the switched cover glass signal.

In FIG. 8B, a compensating element 861b and a receiver polarization control element 862b of the electronic device 850 may be added to suppress the crosstalk contribution from the cover glass signal. In some examples, the receiver may be designed to screen for left circularly polarized light. In some examples, the left circularly polarized light may be provided with a compensating element 861b, which may be a quarter-wave plate oriented at approximately 45 degrees, and the receiver polarization control element 862b may be a linear polarizer with a polarization axis oriented at zero degrees. With the addition of the polarization control elements on the receiver module side, a favorable ratio of the target signal to the cover glass signal may be provided for the electronic device. In some examples, the ratio may depend on the target distance in that the closer the target to the cover glass, the higher the favorable ratio. When the target is farther away from the cover glass, more specular reflection may reduce the ratio. In some examples of FIGS. 6A-6B, 7A-7B, and 8A-8B, additional information may be provided by differentiating between crosstalk signals and the target signals. In some examples, the crosstalk signal may be subtracted from the target signals, thus the electronic device may tolerate a target signal reduction due to the analyzer on the receiver module. As a result, polarization sensitive features on the target or the user's skin may be detectable.

FIG. 8C is a multi-receiver configuration of the electronic device. In FIG. 8C, compensating elements 861C1-4 and a receiver polarization control element 862C1-4 of the electronic device 875 may be added to classify the crosstalk contribution from the cover glass signal or different target signals. The four individually readable receiver segments or polarization pixels have corresponding polarizers (e.g., x, y, xy, and yx), which may form a complete Mueller matrix analyzer. In some embodiments, the ratios between the pixel signals may classify crosstalk signals and different target signals.

Figure 9A:
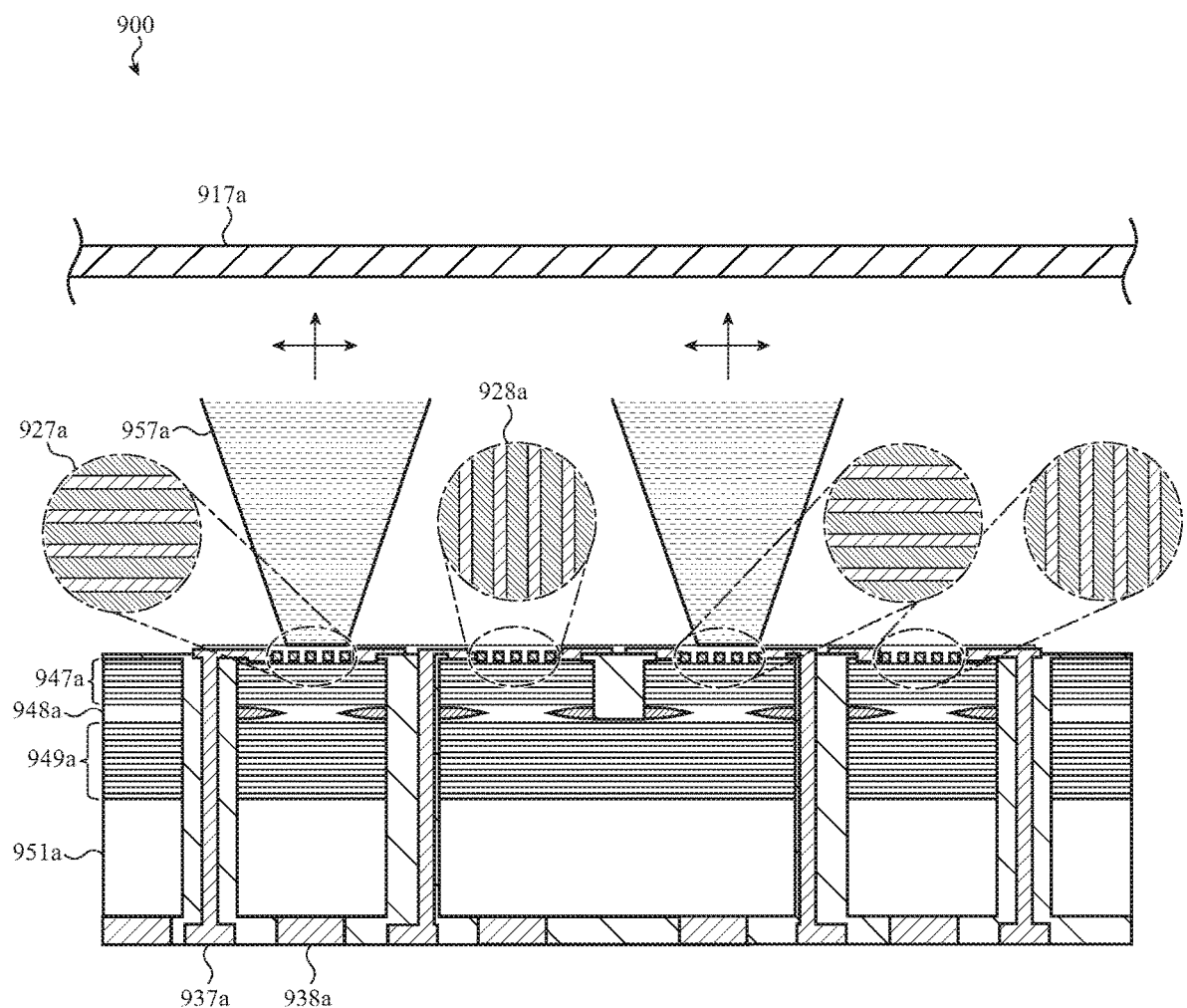
FIGS. 9A and 9B illustrate an example of a vertical cavity surface emitting laser array architecture.
Figure 9B:
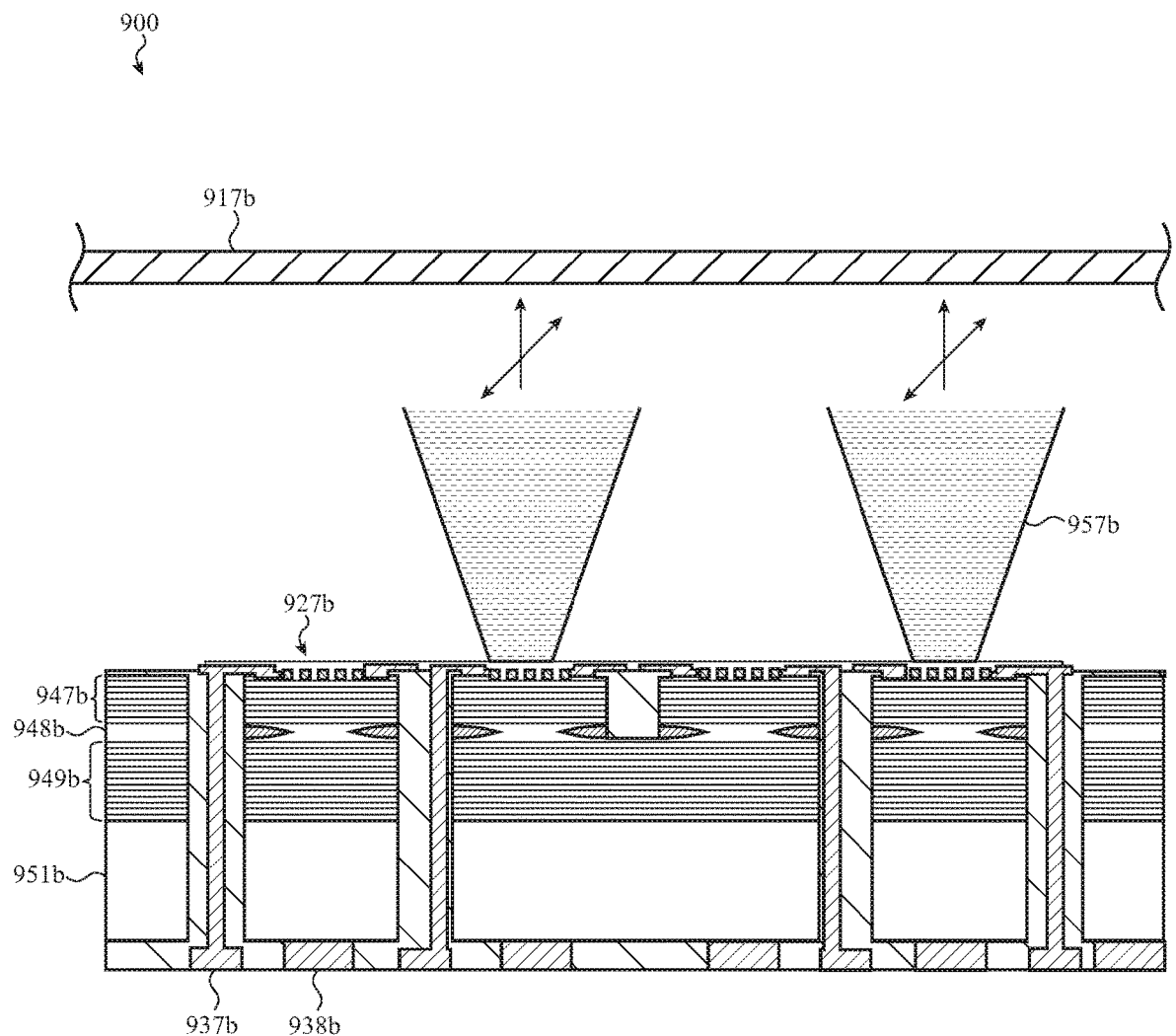

FIGS. 9A and 9B illustrate an example of a vertical cavity surface emitting laser (VCSEL) array architecture 900. Although edge emitting lasers may provide a favorable polarization of light, such as p-polarized light, that may be steered upwards toward the display stack, the examples of FIGS. 9A and 9B illustrate VCSEL arrays which may be used in place of the edge emitting lasers. FIG. 9A may include an array of VCSELS with a wave plate 917A that may compensate for retardation in the stack. Each VCSEL in FIG. 9A may include a top distributed Bragg reflector (DBR) 947a, an oxidation layer 948a, a bottom DBR 949a and a substrate 951a. Contact 937a and bottom contact 938a may be metal and may provide driving current to the VCSEL.

The VCSEL of FIG. 9A may additionally include a transmitter polarization element, such as a surface grating 927a in a first orientation and a surface grating 928a in a second orientation. The surface gratings 927a and 928a may enforce the linear polarization of the light and may mitigate the unstable polarization switching of light emitted by a VCSEL. The VCSEL may emit polarized light 957a, where the polarization control may be achieved using the surface grating structure. In FIG. 9A, the light emitted by the VCSELs may be p-polarized light with respect to the display backplane in the module baseline direction. In some examples, the polarization of light emitted by the VCSEL may be locked using various techniques, including asymmetric gain, cavity geometry, any combination thereof, and so forth. In some examples, the surface grating 927a and 928a may be above the aperture of the VCSEL.

FIG. 9B is similar to 9A, except s-polarized light 957b may be emitted by the VCSEL. Although four VCSELs are illustrated in FIGS. 9A and 9B, fewer or more VCSELs may be used in the array. In some examples, multiple VCSELs may be employed and each emitter may be addressable, thus the polarization of the light being emitted may be changed. As illustrated in FIG. 9B, the neighboring VCSELs may be orthogonal to one another as depicted by gratings 927b and 928b. In some examples, a polarization may be selected such that two s-polarized emitters may be turned on or two p-polarized emitters may be turned on. In some examples, the transceiver module may have additional architectural elements that are not depicted in FIGS. 9A and 9B, but the freedom to tune the lasers and select the polarization of light may offset the additional architectural elements.

Figure 10A:
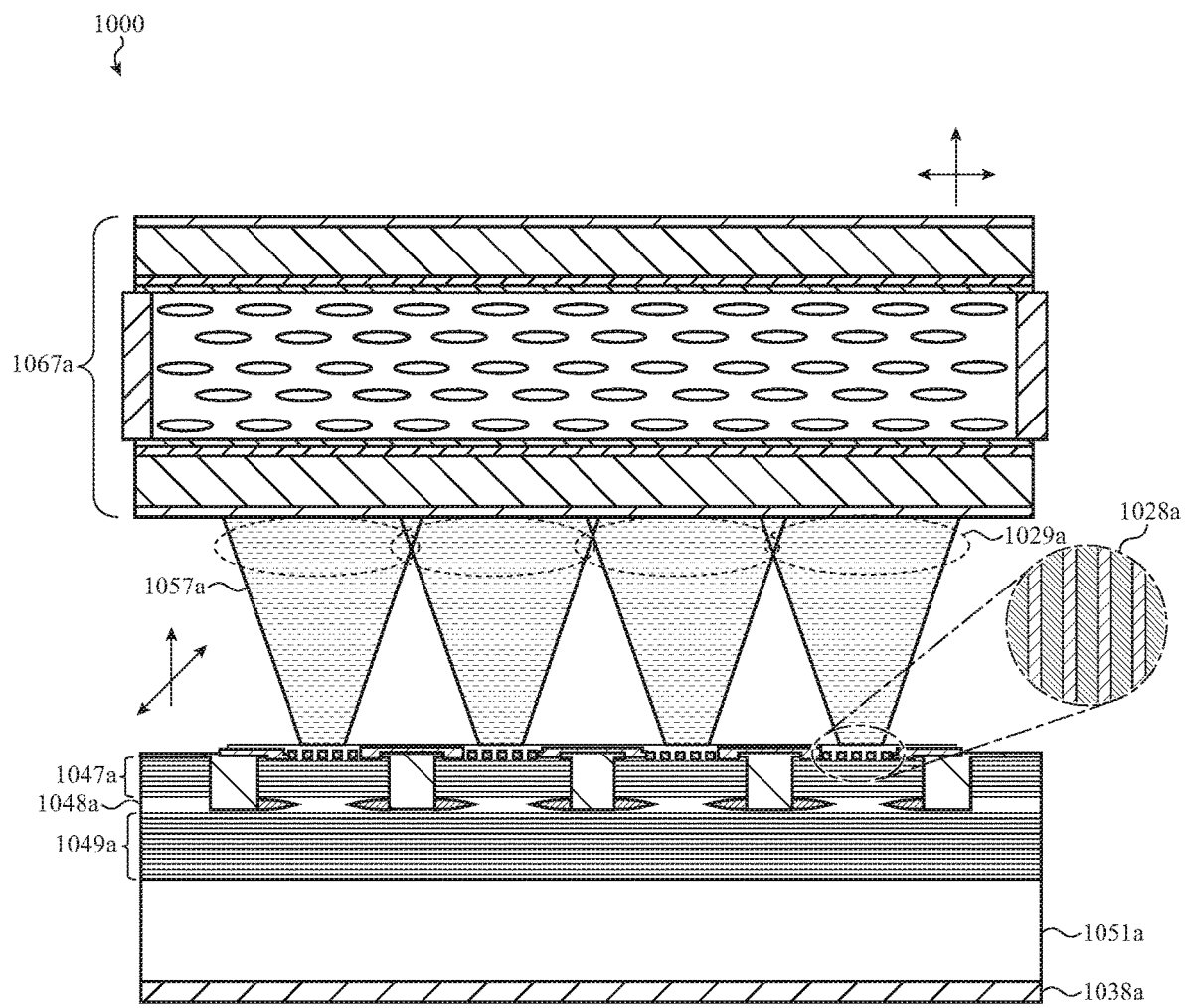
FIGS. 10A and 10B illustrate an example of a vertical cavity surface emitting laser array architecture.
Figure 10B:
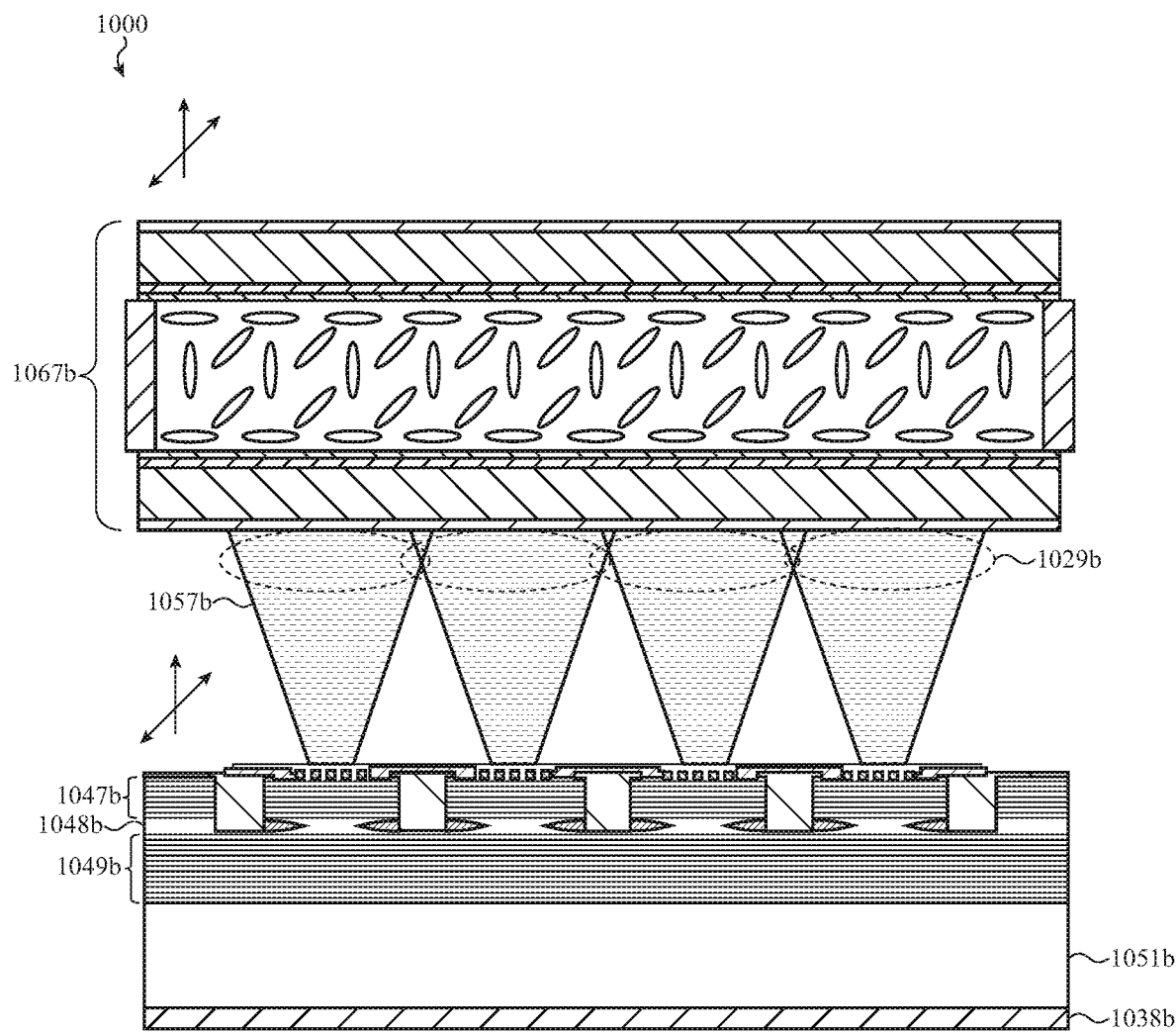

FIGS. 10A and 10B illustrate examples of a vertical cavity surface emitting laser array architecture. FIGS. 10A and 10B are similar to FIGS. 9A and 9B, with the addition of a liquid crystal half-wave plate 1067a. FIG. 10A illustrates four VCSELs, which may include a top DBR 1047a, an oxidation layer 1048a, a bottom DBR 1049a and a surface grating 1028a. In some examples, an external cavity microlens array collimator 1029a may be employed to collimate the light emitted by the VCSELs.

Each of the VCSELs in FIG. 10A may emit s-polarized light that is provided to the liquid crystal half-wave plate 1067a. The liquid crystal half-wave plate 1067a may be switchable and may switch the light between s-polarized light and p-polarized light as depicted in FIG. 10A and depending on the voltage across the liquid crystal half-wave plate 1067A. In FIG. 10B, the liquid crystal half-wave plate 1067b may not switch the polarization of light emitted by the VCSELs as the voltage across the liquid crystal half-wave plate 1067b may be different than the voltage across the liquid crystal half-wave plate 1067a. In some examples, the liquid crystal half-wave plate 1067a may change the retardation and may universally change the polarization for each VCSEL. In some examples, the liquid crystal half-wave plate 1067a may be included in the display when a liquid crystal display is used in the display stack. In still further examples, the liquid crystal half-wave plate may switch between compensating the TFT stack, the display stack, the target, or individual elements of the target stack.

In some examples, the retardance of the liquid crystal half-wave plate 1067a may vary with temperature, thus various methods may be used to compensate for the temperature change of the liquid crystal half-wave plate 1067a. In some examples, temperature may be monitored using a temperature sensing element for on-chip temperature sensing, temperature to voltage look-up tables, polarization extinction ratio monitoring where the photodetectors are behind the polarization beam splitter, any combination thereof, and so forth may be used for compensating the temperature changes.

The present disclosure recognizes that personal information data, including the biometric data acquired using the presently described technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optoelectronic device for mitigating crosstalk, comprising:
   a housing;
   a cover glass attached to the housing;
   a display disposed within the housing and viewable through the cover glass;
   a transmitter module positioned under the display and comprising:
      a transmitter polarization control element, and
      an optical emitter configured to emit light toward the transmitter polarization control element, the transmitter polarization control element changing a polarization state of light and passing the polarized light toward the display; and
   a receiver module positioned under the display and comprising:
      a receiver polarization control element; and
      an optical receiver configured to detect a portion of the polarized light reflected off a target external to the cover glass and received through the receiver polarization control element.

2. The optoelectronic device of claim 1, wherein:
   the optoelectronic device further comprises a display stack, the display stack comprising:
      the cover glass;
      the display;
      the transmitter module;
      the receiver module; and
      a thin film transistor stack positioned under the display;
   the polarized light suppresses crosstalk signals by aligning the polarized light with an orientation of the optical axis of the display stack; and
   the receiver polarization control element differentiates between the crosstalk signals and the polarized light reflected off the target external to the cover glass.

3. The optoelectronic device of claim 1, further comprising:
   a display stack, wherein the transmitter polarization control element polarizes light and aligns the polarization of light to an orientation of the optical axis of the display stack.

4. The optoelectronic device of claim 1, wherein the optical receiver comprises a polarization analyzing receiver.

5. The optoelectronic device of claim 1, wherein the receiver module comprises a compensating element.

6. The optoelectronic device of claim 5, wherein the compensating element comprises a wave plate with a fixed retardation.

7. The optoelectronic device of claim 5, wherein the compensating element comprises a dielectric retarder.

8. The optoelectronic device of claim 1, wherein:
   the polarized light is p-polarized light; and
   the p-polarized light has a polarization that aligns with an orientation of the optical axis of the thin film transistor stack.

9. The optoelectronic device of claim 1, wherein the optical emitter is an edge emitting laser configured to emit a linearly polarized light.

10. The optoelectronic device of claim 1, wherein the receiver module is configured to filter out crosstalk signals with the receiver polarization control element.

11. The optoelectronic device of claim 1, wherein:
   the transmitter polarization control element is a first transmitter polarization control element and comprises a polarizer;
   the optoelectronic device comprises a second transmitter polarization control element comprising a transmitter compensating element; and
   the receiver polarization control element comprises a wave plate.

12. The optoelectronic device of claim 1, wherein:
   the transmitter module comprises a first beam shaping optical element; and
   the receiver module comprises a second beam shaping optical element.

13. The optoelectronic device of claim 1, further comprising:
   a transmitter polarization monitor configured to monitor properties of the polarized light.

14. A method for mitigating crosstalk in an electronic device, comprising:
   emitting light using a transmitter module, comprising:
      polarizing the emitted light;
      providing the polarized light through an element of a display stack including a display, to a target;
   receiving a reflection of the polarized light from the target, at a receiver module;
   analyzing the received reflection of the polarized light; and
   differentiating between the reflection of the polarized light from the target and a crosstalk generated by a second reflection of the polarized light off of or within the display stack.

15. The method of claim 14, further comprising:
suppressing the crosstalk signals by:
receiving the polarized light from the transmitter module and by a back film that passes a first part of the polarized light through the back film and reflects a second part of the polarized light in a direction of the receiver module; and
receiving the polarized light from the back film by a thin film transistor stack, wherein a polarization of the polarized light matches an orientation of the optical axis of the thin film transistor stack.

16. The method of claim 14, further comprising:
suppressing the crosstalk signals by:
providing p-polarized light that matches the orientation of the optical axis of the thin film transistor stack; and
reducing back reflections at an interface between a thin film transistor stack and a back film.

17. The method of claim 14, further comprising:
receiving the polarized light from the transmitter module and by a back film where the polarization of the polarized light matches the orientation of the optical axis of the back film.

18. The method of claim 14, further comprising:
actively monitoring the polarization of the polarized light.

19. The method of claim 14, further comprising:
polarization locking the polarized light by using a transmitter polarization control element.

20. A mobile device, comprising:
a display stack, comprising:
a display;
a thin film transistor stack disposed under the display; and
a back film disposed under the thin film transistor stack;
a transmitter module comprising multiple emitters, at least one of the multiple emitters comprising a vertical cavity surface emitting laser (VCSEL);
a microlens array collimator positioned in a light emission path of the transmitter module;
a liquid crystal cell positioned in the light emission path of the transmitter module and operable to switch between polarizations of light;
a transmitter polarization element comprising a surface grating of the VCSEL; and
a receiver module, comprising;
a receiver optical element;
a receiver compensating element;
a polarization analyzer; and
a detector.

21. The mobile device of claim 20, wherein:
the multiple emitters emit alternating polarizations of light; and
the multiple emitters are individually addressable to select a polarization of light.

22. The mobile device of claim 20, further comprising:
a liquid crystal cell for switching between polarizations of light; and
a temperature sensing element to compensate for a retardance temperature dependence of the liquid crystal cell.

23. The mobile device of claim 22, wherein the liquid crystal cell comprises a liquid crystal half-wave plate.

* * * * *

UNITED STATES PATENT AND TRADEMARK OFFICE
CERTIFICATE OF CORRECTION

| | | |
|---|---|---|
| PATENT NO. | : 11,487,859 B2 | Page 1 of 1 |
| APPLICATION NO. | : 16/945174 | |
| DATED | : November 1, 2022 | |
| INVENTOR(S) | : Tong Chen et al. | |

It is certified that error appears in the above-identified patent and that said Letters Patent is hereby corrected as shown below:

In the Specification

Column 4, Line 47, "including the display, may be may be poorly transmissive"
Should read as --including the display, may be poorly transmissive--

In the Claims

Column 18, Line 26, Claim 8, "orientation of the optical axis of the thin film transistor"
Should read as --orientation of the optical axis of a thin film transistor--

Column 19, Line 14, Claim 16, "providing p-polarized light that matches the orientation"
Should read as --providing p-polarized light that matches an orientation--

Column 19, Line 15, Claim 16, "of the optical axis of the thin film transistor stack;"
Should read as --of the optical axis of a thin film transistor stack;--

Column 19, Line 17, Claim 16, "reducing back reflections at an interface between a thin"
Should read as --reducing back reflections at an interface between the thin--

Column 19, Line 21, Claim 17, "and by a back film where the polarization of the"
Should read as --and by a back film where a polarization of the--

Column 19, Line 22, Claim 17, "polarized light matches the orientation of the optical"
Should read as --polarized light matches an orientation of the optical--

Column 19, Line 24, Claim 18, "actively monitoring the polarization of the polarized light."
Should read as --actively monitoring a polarization of the polarized light.--

Signed and Sealed this
Twenty-first Day of February, 2023

*Katherine Kelly Vidal*
Katherine Kelly Vidal
*Director of the United States Patent and Trademark Office*